US006931295B2

(12) United States Patent
Lin et al.

(10) Patent No.: US 6,931,295 B2
(45) Date of Patent: Aug. 16, 2005

(54) METHOD AND SYSTEM OF CALCULATING LOT HOLD TIME

(75) Inventors: Chun-Hung Lin, Fongshan (TW); Ta-Chin Lin, Taipei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 48 days.

(21) Appl. No.: 10/725,239

(22) Filed: Dec. 1, 2003

(65) Prior Publication Data

US 2005/0119775 A1 Jun. 2, 2005

(51) Int. Cl.[7] .............................................. G06F 19/00
(52) U.S. Cl. ..................... 700/100; 700/101; 700/102; 700/103; 700/104; 700/114
(58) Field of Search ............................... 700/100–104, 700/114

(56) References Cited

U.S. PATENT DOCUMENTS

| | | | |
|---|---|---|---|
| 4,802,094 A * | 1/1989 | Nakamura et al. | 700/115 |
| 6,049,742 A * | 4/2000 | Milne et al. | 700/99 |
| 6,308,107 B1 * | 10/2001 | Conboy et al. | 700/121 |
| 6,535,778 B2 * | 3/2003 | Okabe et al. | 700/112 |
| 6,546,113 B1 | 4/2003 | Lucas et al. | 382/100 |
| 6,564,113 B1 * | 5/2003 | Barto et al. | 700/99 |
| 6,725,113 B1 * | 4/2004 | Barto et al. | 700/99 |
| 6,748,287 B1 * | 6/2004 | Hagen et al. | 700/99 |
| 2003/0171972 A1 * | 9/2003 | Heskin | 705/9 |

OTHER PUBLICATIONS

"Shifting Boltleneck Detection"—Roser et al, Toyota Central Research and Development Labs, 2002 Winter Simulation Conference.*

"Semiconductor Factory Automation: Designing for Phased Automation"—Gardner et al, Hewlett-Packard Corporation, IEEE 1996.*

* cited by examiner

Primary Examiner—Leo Picard
Assistant Examiner—Michael D. Masinick
(74) Attorney, Agent, or Firm—Thomas, Kayden, Horstemeyer & Risley

(57) ABSTRACT

A method of calculating lot hold time. First, identification parameters of a lot are input. The lot may be a split child lot or an unsplit parent lot. The identification parameters include an identification code and a customer hold code of the lot. The identification code identifies the lot type. The customer hold code identifies the holder. Lot hold time is then calculated according to the identification parameters. Finally, the lot hold time is output for further utilization.

33 Claims, 4 Drawing Sheets

METHOD AND SYSTEM OF CALCULATING LOT HOLD TIME

BACKGROUND OF THE INVENTION

1. Field of the Invention

The present invention relates to cycle time calculating technology, and in particular to a computer-implemented method of calculating lot hold time.

2. Description of the Related Art

In an IC foundry, a lot refers to a batch of wafers. The cycle time of a lot processed by a working tool is decided by certain time factors, such as transport in time, Bank-Q time, process time, lot hold time, and transport out time. The transport in time represents the transfer time of the lot from a prior tool to the working tool. Bank-Q Time is time of the lot on the working tool waiting for processing. The process time is the actual working time on the working tool. The lot hold time indicates the time that the lot has to be held in the process, either single or multiple. The transport out time represents the transfer time of the lot from the working tool to the next tool.

Among the time factors, the lot hold time is the most uncertain. Thus, lot hold time creates a bottleneck in cycle time calculation of a lot. There are two main reasons for lot hold time uncertainty. One is a child lot problem and another is a multiple hold problem.

The child lot problem may occur after a lot is split. The conventional lot hold time calculating method only calculates the cycle time of the parent lot, ignoring the child lot. The multiple hold problem may occur after a lot processes multiple hold by different holders. The conventional lot hold time calculating method adopts the last lot hold to calculate the hold time, causing considerable inaccuracy.

U.S. Pat. No. 6,546,113 discloses a method of lot start that calculates virtual WIP time in a multi-product and multi-bottleneck manufacturing environment. The disclosed method is provided for calculating virtual WIP time ("VWIP") in a multiple-bottleneck, multi-product manufacturing facility. The system and method provide calculation of one or more bottleneck VWIP values. Each of the bottleneck VWIP values represents the amount of work approaching one of n bottleneck workstations, where n>o. The work approaching the bottleneck workstation comprises at least one of m products, where m>o. The method, however, is not characterized by resolving the child lot and multiple lot hold problems of lot hold time calculation.

SUMMARY OF THE INVENTION

Accordingly, an object of the invention is to provide a method of calculating lot hold time. The inventive method calculates lot hold time according to identification parameters of the lot, avoiding child lot and multiple hold problems.

To achieve the foregoing and other objects, the invention is directed to novel systems and methods for overcoming conventional lot hold time calculation problems. First, identification parameters of a lot are input. The lot may be a child lot processed through lot splitting or an unsplit parent lot. In addition, the lot may pass through several lot holds by different lot holders. The lot hold halts lot processing. The lot holds can be accomplished by administrators, customers, and operators. The identification parameters comprise an identification code and a customer hold code of the lot. The identification code identifies whether the lot is a child lot. The customer hold code distinguishes between lot holders.

The lot hold time is then calculated according to the identification parameters and a reference database. In an IC foundry, the reference database is usually a MES (manufacturing execution system) database. Finally, the lot hold time is output for further utilization, such as cycle time calculation.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
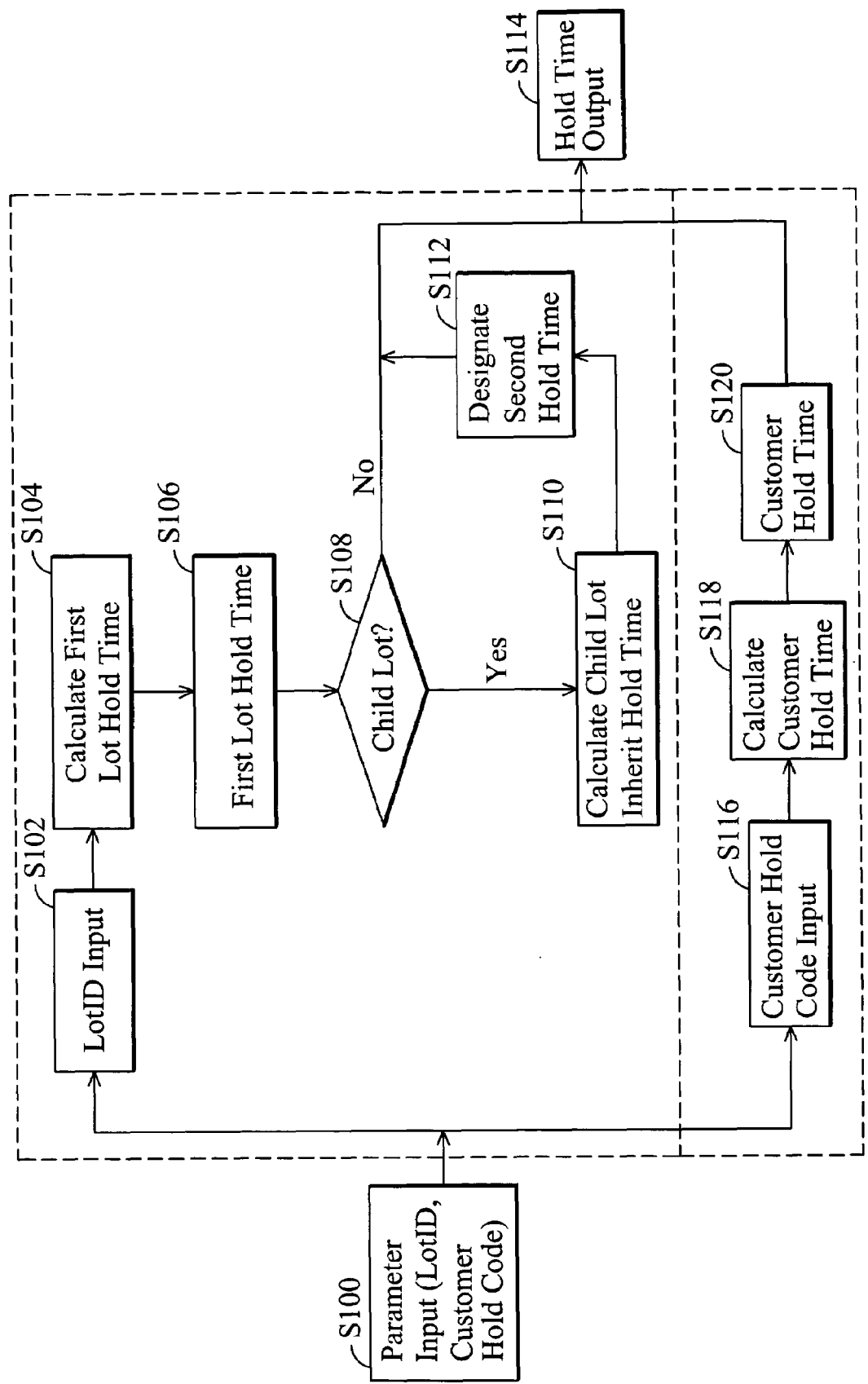
FIG. 1 is a flowchart of the computer-implemented method of calculating lot hold time.

As summarized above, the present invention is directed to novel systems and methods for overcoming conventional lot hold time calculation problems. In one embodiment, the inventive method first inputs identification parameters of a lot. The method then calculates lot hold time accordingly. Finally, the method outputs the calculated lot hold time. The identification parameters include an identification code and a customer hold code of the lot. The lot may be a split child lot and may be processed by multiple lot holds. Each lot hold has its own start time and termination time.

The calculation can be accomplished by the following steps. First, the start time of the first lot hold and the termination time of the last lot hold are obtained from a reference database to calculate first hold time. The reference database is generally a MES database. Next, a determination is made to confirm whether the lot is the child lot according to the identification code. If the lot is a child lot, inherited hold time is calculated according to the identification code and the reference database. The sum of the first hold time and the inherited hold time is output as the hold time. If the lot is not a child lot, the first hold time is output as the hold time.

In another embodiment, the inventive method first inputs identification parameters of a lot. The method then calculates lot hold time accordingly. The identification parameters also include an identification code and a customer hold code of the lot. Similarly, the lot may be a split child lot and may have several lot holds. Each lot hold has its own start time and termination time.

The calculation can be accomplished by the following steps. First, the start time of the first lot hold and the termination time of the last lot hold are obtained from a reference database to calculate first hold time. The start time of the first customer lot hold and the termination time of the last customer lot hold are obtained from the reference database to calculate the customer hold time. The reference database is a MES database.

Next, a confirmation is made of whether the lot is a child lot according to the identification code. If the lot is a child lot, inherited hold time is calculated according to the identification code and the reference database. Second hold time is then designated as the sum of the first hold time and the inherited hold time. Finally, the second hold time and the customer hold time are output as the hold time if the lot is a child lot. If the lot is not a child lot, the first hold time and the customer hold time are output as the hold time.

The major difference between the disclosed two embodiments is the customer hold time. The customer hold time is not distinguished particularly in the first embodiment, but is in the second embodiment. In some actual implementations of IC foundry, the customer hold time must be considered discreetly from the hold time. The two disclosed embodiments can satisfy different application situations.

In addition, the invention discloses a storage medium for storing a computer program providing a method of calculating lot hold time. The method includes the steps disclosed.

Furthermore, the invention discloses a system of calculating lot hold time. In one embodiment, the system includes an input module, a calculation module, and an output module. The input module inputs identification parameters of a lot. The calculation module calculates lot hold time accordingly. The output module outputs the lot hold time. The identification parameters include an identification code and a customer hold code of the lot. The lot may be a split child lot and may pass through several lot holds. Each lot hold has its own start time and termination time.

The calculation module further comprises a first calculation module, a determination module, a child lot calculation module, a child lot output module, and a non-child lot output module.

The first calculation module obtains the start time of the first lot hold and obtains the termination time of the last lot hold from a reference database to calculate first hold time. The determination module determines if the lot is a child lot according to the identification code. The child lot calculation module calculates inherited hold time according to the identification code and the reference database if the lot is a child lot. The child lot output module outputs the sum of the first hold time and the inherited hold time as the hold time if the lot is a child lot. The non-child lot output module outputs the first hold time as the hold time if the lot is not a child lot.

In another embodiment, the system includes an input module, a calculation module, and an output module. The input module inputs identification parameters of a lot. The calculation module calculates lot hold time accordingly. The output module outputs the lot hold time. Similarly, the identification parameters include an identification code and a customer hold code of the lot. The lot may be a split child lot and the lot may pass through several lot holds. Each lot hold has its own start time and termination time.

The calculation module further includes a first calculation module, a customer calculation module, a determination module, a child lot calculation module, a designation module, and a non-child lot output module.

The first calculation module obtains the start time of the first lot hold and the termination time of the last lot hold from a reference database to calculate first hold time. The reference database is generally a MES database.

The customer calculation module obtains the customer start time of the customer first lot hold and the customer termination time of the last customer lot hold from the reference database to calculate customer hold time.

The determination module determines if the lot is a child lot according to the identification code. The child lot calculation module calculates inherited hold time according to the identification code and the reference database if the lot is a child lot. The designation module designates second hold time as the sum of the first hold time and the inherited hold time.

The child lot output module outputs the second hold time and the customer hold time as the hold time if the lot is a child lot. The non-child lot output module outputs the first hold time and the customer hold time as the hold time if the lot is not a child lot.

As well, the invention provides an IC product produced with a method of calculating lot hold time, the method comprising the disclosed steps.

FIG. 1 is a flowchart of the computer-implemented method of calculating lot hold time. In one embodiment, first identification parameters of a lot are input (step S100). The identification parameters include a identification code (step S102) and a customer hold code of the lot (step S116). First hold time is then calculated according to the identification code and a reference database (step S104, step S106). A determination is made of whether the lot is a child lot according to the identification code (step S108). If the lot is a child lot, inherited hold time is calculated according to the identification code and the reference database (step S110). Second hold time is then designated as the sum of the first hold time and the inherited hold time (step S112). Finally, the second hold time and the customer hold time are output as the hold time (step S114). In step S108, if the lot is not a child lot the first hold time and the customer hold time are output as the hold time (step S114).

In another embodiment, identification parameters of a lot are first input (step S100). The identification parameters include an identification code (step S102) and a customer hold code of the lot (step S116). First hold time is calculated according to the identification code and a reference database (step S104, step S106). Customer hold time is calculated according to the customer hold code and the reference database (step s118).

A determination is then made of whether the lot is a child lot according to the identification code (step S108). If the lot is a child lot, inherited hold time is calculated according to the identification code and the reference database (step S110). Second hold time is then designated as the sum of the first hold time and the inherited hold time (step S112). Finally, the second hold time and the customer hold time are output as the hold time (step S114). In step S108, if the lot is not a child lot, the first hold time and the customer hold time are output as the hold time (step S114).

Figure 2:
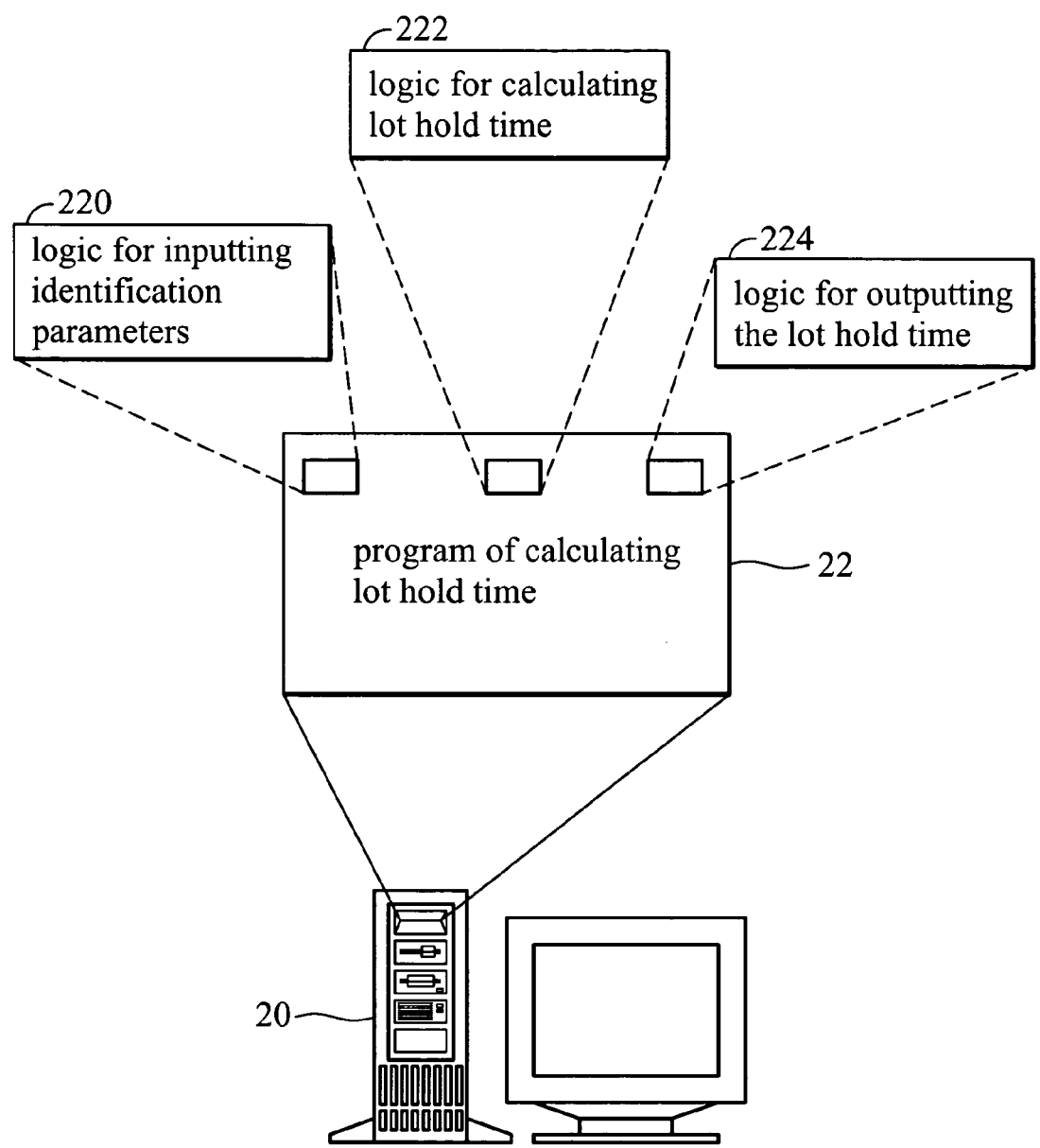
FIG. 2 is a diagram of the storage medium for storing a computer program providing a method of calculating lot hold time.

FIG. 2 is a diagram of the storage medium for storing a computer program providing a method of calculating lot hold time. The storage medium 20 stores a computer program 22. The computer program 22 provides a method of calculating lot hold time. The computer program 22 mainly includes logic for inputting identification parameters 220, logic for calculating lot hold time 222, and logic for outputting the lot hold time.

Figure 3:
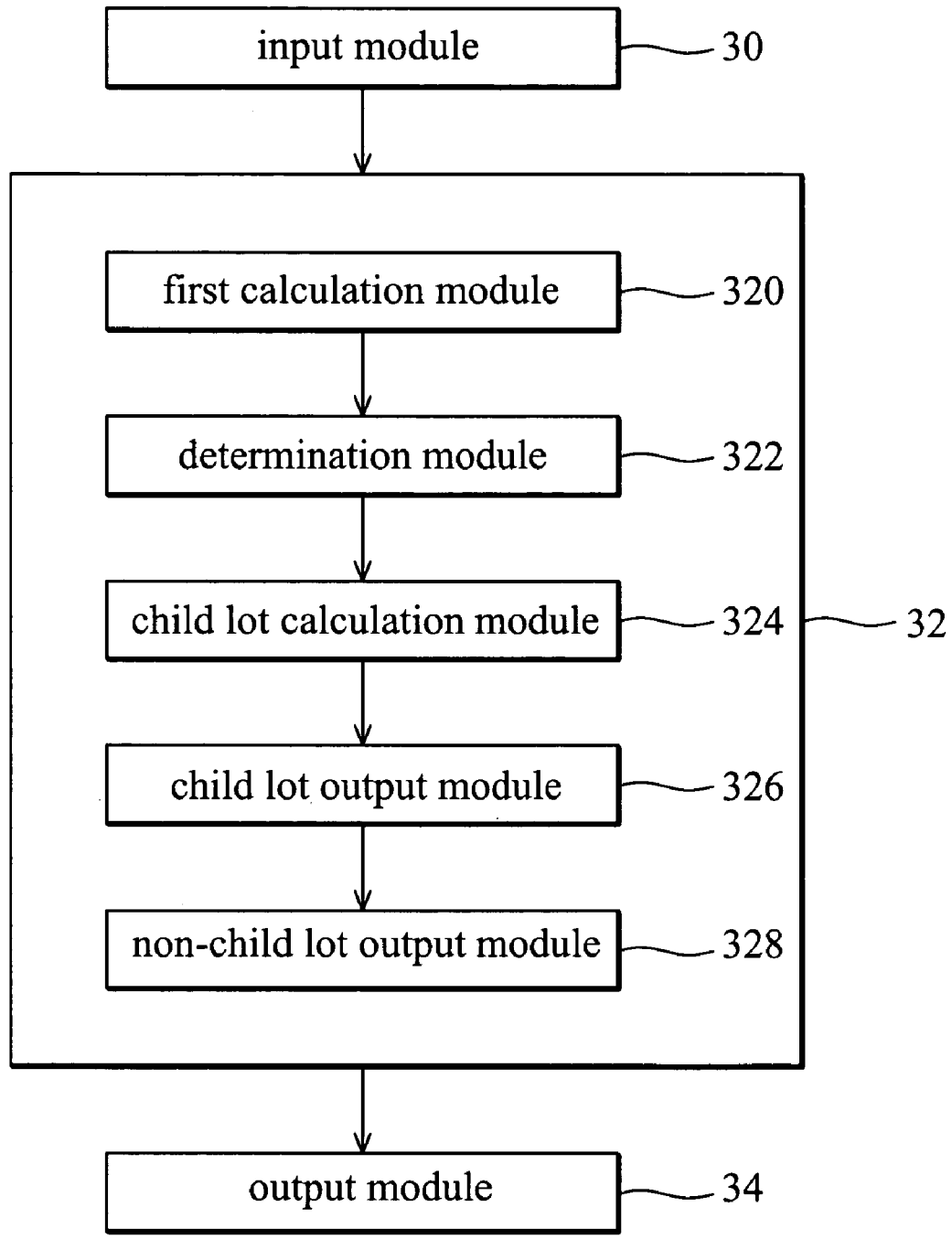
FIG. 3 is a diagram of the system of calculating lot hold time.

FIG. 3 is a diagram of the system of calculating lot hold time. In one embodiment, the system includes an input module 30, a calculation module 32, and an output module 34. The input module 30 inputs identification parameters of a lot. The calculation module 32 calculates lot hold time of the lot according to the identification parameters. The output module 34 outputs the lot hold time.

The calculation module 32 further comprises a first calculation module 320, a determination module 322, a child lot calculation module 324, a child lot output module 326, and a non-child lot output module 328.

The first calculation module 320 obtains the start time of the first lot hold and the termination time of the last lot hold from a reference database to calculate first hold time. The determination module 322 determines if the lot is a child lot according to the identification code. The child lot calculation module 324 calculates inherited hold time according to the identification code and the reference database if the lot is a child lot. The child lot output module 326 outputs the sum of the first hold time and the inherited hold time as the hold time if the lot is a child lot. If the lot is not a child lot, the non-child lot output module 328 outputs the first hold time as the hold time.

Figure 4:
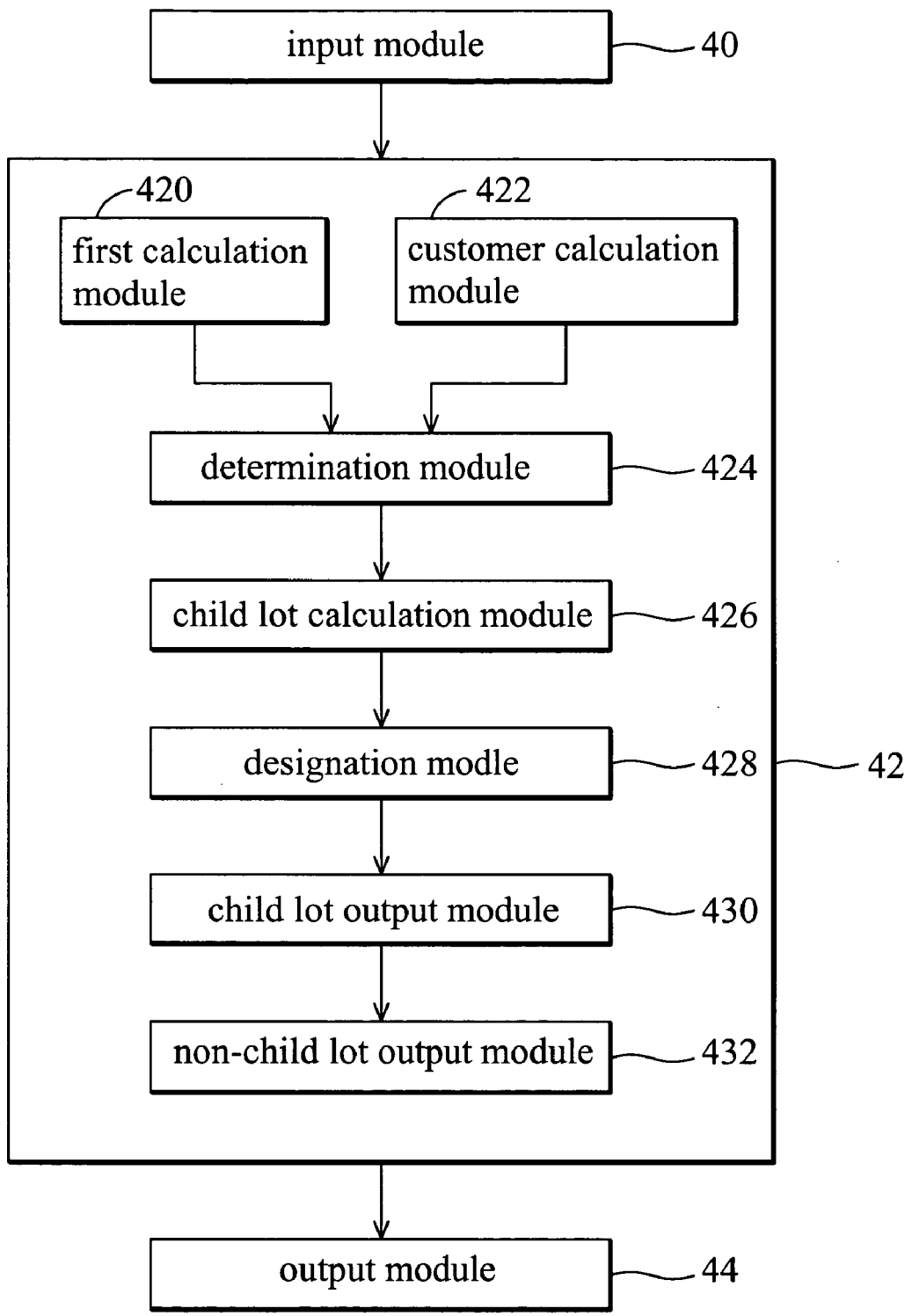
FIG. 4 is a diagram of another implementation of the system of calculating lot hold time.

FIG. 4 is a diagram of another implementation of the system of calculating lot hold time. In another embodiment, the system includes an input module 40, a calculation module 42, and an output module 44. The input module 40 inputs identification parameters of a lot. The calculation module 42 calculates lot hold time accordingly. The output module 44 outputs the lot hold time.

The calculation module 42 further includes a first calculation module 420, a customer calculation module 422, a determination module 424, a child lot calculation module 426, a designation module 428, a child lot output module 430, and a non-child lot output module 432.

The first calculation module 420 obtains the start time of the first lot hold and the termination time of the last lot hold from a reference database to calculate first hold time. The reference database may be a MES database.

The customer calculation module 422 obtains the customer start time of the customer first lot hold and the customer termination time of the last customer lot hold from the reference database to calculate customer hold time.

The determination module 424 determines if the lot is a child lot according to the identification code. The child lot calculation module 426 calculates inherited hold time according to the identification code and the reference database if the lot is a child lot. The designation module 428 designates second hold time as the sum of the first hold time and the inherited hold time if the lot is a child lot.

The child lot output module 430 outputs the second hold time and the customer hold time as the hold time if the lot is a child lot. The non-child lot output module 432 outputs the first hold time and the customer hold time as the hold time if the lot is not a child lot.

Thus, a method of calculating lot hold time is provided by the invention. Lot hold time is the most difficult part of cycle time to predict. The disclosed method and system calculate the lot hold time by inputting certain parameters of a lot to achieve cycle time calculation, presenting significant advantages to IC foundries.

It will be appreciated from the foregoing description that the system and method described herein provide a dynamic and robust solution to the lot hold time problems. If, for example, lot splitting and lot holds are executed in different processes of a foundry, the system and method of the present invention can revise the lot hold calculating times to fit the actual execution of the foundry.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer-implemented method of calculating lot hold time, comprising using a computer to perform the steps of:
   inputting a plurality of identification parameters of a lot;
   calculating a lot hold time of the lot according to the identification parameters, wherein the calculating further comprises
      calculating a first hold time according to an identification code and a reference database;
      determining if the lot is a child lot according to the identification code;
      calculating an inherited hold time according to the identification code and the reference database if the lot is a child lot; and
   outputting the sum of the first hold time and the inherited hold time as the lot hold time if the lot is a child lot or outputting the first hold time as the lot hold time if the lot is not a child lot.

2. The computer-implemented method as claimed in claim 1, wherein the lot is a split child lot.

3. The computer-implemented method as claimed in claim 1, wherein the lot is passed through a first lot hold and a last lot hold, the first lot hold having a start time, the last lot hold having a termination time.

4. The computer-implemented method as claimed in claim 1, wherein the lot is passed through a first customer lot hold and a last customer lot hold, the first customer lot hold having a customer start time, the last customer lot hold having a customer termination time.

5. The computer-implemented method as claimed in claim 1, wherein the identification parameters comprise an identification code of the lot and a customer hold code of the lot.

6. The computer-implemented method as claimed in claim 1, wherein step of calculating the first hold time further comprises the steps of:
   obtaining the start time of the first lot hold from the reference database;
   obtaining the termination time of the last lot hold from the reference database; and
   calculating the first hold time according to the start time of the first lot hold and the termination time of the last lot hold.

7. The computer-implemented method as claimed in claim 1, wherein the reference database is enabled by a MES database.

8. The computer-implemented method as claimed in claim 1, further comprising:
   calculating a customer hold time according to the customer hold code and the reference database;
   designating a second hold time as the sum of the first hold time and the inherited hold time if the lot is a child lot; and outputting the second hold time and the customer hold time as the hold time if the lot is a child lot or outputting the first hold time and the customer hold time as the hold time if the lot is not a child lot.

9. The computer-implemented method as claimed in claim 8, wherein step of calculating the first hold time further comprises the steps of:
obtaining the start time of the first lot hold from the reference database;
obtaining the termination time of the last lot hold from the reference database;
calculating the first hold time according to the start time of the first lot hold and the termination time of the last lot hold.

10. The computer-implemented method as claimed in claim 8, wherein step of calculating the customer hold time further comprises the steps of:
obtaining the customer start time of the customer first lot hold from the reference database;
obtaining the customer termination time of the last customer lot hold from the reference database; and
calculating the customer hold time according to the customer start time of the customer first lot hold and the customer termination time of the last customer lot hold.

11. The computer-implemented method as claimed in claim 8, wherein the reference database is enabled by a MES database.

12. A computer program embodied on a computer-readable storage medium for carrying out a method of calculating a lot hold time, the computer program comprising code for instructing a computer to perform the steps of
inputting a plurality of identification parameters of a lot;
calculating lot hold time of the lot according to the identification parameters wherein the calculating further comprises
calculating a first hold time according to an identification code and a reference database;
determining if the lot is a child lot according to the identification code;
calculating an inherited hold time according to the identification code and the reference database if the lot is a child lot; and
outputting the sum of the first hold time and the inherited hold time as the lot hold time if the lot is a child lot or outputting the first hold time as the lot hold time if the lot is not a child lot.

13. The computer program as claimed in claim 12, wherein the lot is a split child lot.

14. The computer program as claimed in claim 12, wherein the lot is passed through a first lot hold and a last lot hold, the first lot hold having a start time, the last lot hold having a termination time.

15. The computer program as claimed in claim 12, wherein the lot is passed through a first customer lot hold and a last customer lot hold, the first customer lot hold having a customer start time, the last customer lot hold having a customer termination time.

16. The computer program as claimed in claim 12, wherein the identification parameters comprise an identification code of the lot and a customer hold code of the lot.

17. The computer program as claimed in claim 12, wherein the calculating step of the first hold time further comprises the steps of:
obtaining the start time of the first lot hold from the reference database;
obtaining the termination time of the last lot hold from the reference database; and
calculating the first hold time according to the start time of the first lot hold and the termination time of the last lot hold.

18. The computer program as claimed in claim 12, wherein the reference database is enabled by a MES database.

19. The computer program as claimed in claim 12, further comprising:
calculating a customer hold time according to the customer hold code and the reference database;
designating a second hold time as the sum of the first hold time and the inherited hold time if the lot is a child lot; and
outputting the second hold time and the customer hold time as the hold time if the lot is a child lot or outputting the first hold time and the customer hold time as the hold time if the lot is not a child lot.

20. The computer program as claimed in claim 19, wherein step of calculating the first hold time further comprises the steps of:
obtaining the start time of the first lot hold from the reference database;
obtaining the termination time of the last lot hold from the reference database; and
calculating the first hold time according to the start time of the first lot hold and the termination time of the last lot hold.

21. The computer program as claimed in claim 19, wherein step of calculating the customer hold time further comprises the steps of:
obtaining the customer start time of the customer first lot hold from the reference database;
obtaining the customer termination time of the last customer lot hold from the reference database; and
calculating the customer hold time according to the customer start time of the customer first lot hold and the customer termination time of the last customer lot hold.

22. The computer program as claimed in claim 19, wherein the reference database is enabled by a MES database.

23. A computer system for calculating lot hold time, comprising:
an input module, inputting a plurality of identification parameters of a lot;
a calculation module, calculating lot hold time of the lot according to the identification parameters, the calculation module further comprising
a first calculation module, calculating first hold time according to the identification code and a reference database;
a determination module, determining if the lot is a child lot according to the identification code;
a child lot calculation module, calculating inherited hold time according to the identification code and the reference database if the lot is a child lot; and
a child lot output module, outputting the sum of the first hold time and the inherited hold time as the hold time if the lot is a child lot; and
a non-child lot output module, outputting the first hold time as the hold time if the lot is not a child lot.

24. The computer system as claimed in claim 23, wherein the lot is a split child lot.

25. The computer system as claimed in claim 23, wherein the lot is passed through a first lot hold and a last lot hold, the first lot hold having a start time, the last lot hold having a termination time.

26. The computer system as claimed in claim 23, wherein the lot is passed through a first customer lot hold and a last customer lot hold, the first customer lot hold having a customer start time, the last customer lot hold having a customer termination time.

27. The computer system as claimed in claim 23, wherein the identification parameters comprise an identification code of the lot and a customer hold code of the lot.

28. The computer system as claimed in claim 23, wherein the first calculation module further obtains the start time of the first lot hold from the reference database, obtains the termination time of the last lot hold from the reference database, and calculates the first hold time according to the start time of the first lot hold and the termination time of the last lot hold.

29. The computer system as claimed in claim 23, wherein the reference database is enabled by a MES database.

30. The computer The system as claimed in claim 23, further comprising:
    a customer calculation module, calculating customer hold time according to the customer hold code and the reference database; and
    a designation module, designating second hold time as the sum of the first hold time and the inherited hold time if the lot is a child lot.

31. The computer system as claimed in claim 30, wherein the first calculation module further obtains the start time of the first lot hold from the reference database, obtains the termination time of the last lot hold from the reference database, and calculates the first hold time according to the start time of the first lot hold and the termination time of the last lot hold.

32. The computer system as claimed in claim 30, wherein the customer calculation module further obtains the customer start time of the customer first lot hold from the reference database, obtains the customer termination time of the last customer lot hold from the reference database, and calculates the customer hold time according to the customer start time of the customer first lot hold and the customer termination time of the last customer lot hold.

33. The computer system as claimed in claim 30, wherein the reference database is enabled by a MES database.

* * * * *